United States Patent
Whims et al.

(10) Patent No.: US 10,279,416 B2
(45) Date of Patent: May 7, 2019

(54) WELD FORCED CRACK AND BRAZE REPAIR FOR SUPERALLOYS

(71) Applicant: General Electric Company, Schenectady, NY (US)

(72) Inventors: Lawrence James Whims, Simpsonville, SC (US); John Christopher Lambert, Simpsonville, SC (US); Cem Murat Eminoglu, Simpsonville, SC (US); Gary Charles Shubert, Woodruff, SC (US); Piotr Artur Klimczuk, Warsaw (PL); Adam Gaik, Warsaw (PL)

(73) Assignee: General Electric Company, Schenectady, NY (US)

( * ) Notice: Subject to any disclaimer, the term of this patent is extended or adjusted under 35 U.S.C. 154(b) by 497 days.

(21) Appl. No.: 15/070,324

(22) Filed: Mar. 15, 2016

(65) Prior Publication Data
US 2017/0266749 A1     Sep. 21, 2017

(51) Int. Cl.
*B23K 1/00*     (2006.01)
*B23K 9/00*     (2006.01)
(Continued)

(52) U.S. Cl.
CPC ............. *B23K 9/23* (2013.01); *B23K 1/0018* (2013.01); *B23K 9/0026* (2013.01); *B23K 9/04* (2013.01); *B23K 9/235* (2013.01); *B23K 28/02* (2013.01); *B23P 6/007* (2013.01); *B23P 6/045* (2013.01); *C22F 1/10* (2013.01); *F01D 5/005* (2013.01); *B23K 2101/001* (2018.08); *B23K 2103/08* (2018.08); *C22C 19/055* (2013.01);
(Continued)

(58) Field of Classification Search
CPC ........ B23K 9/23; B23K 9/0026; B23K 31/02; B23K 1/0018; B23K 9/235; B23K 2201/001; B23K 2203/08; B23P 6/045; B23P 6/007; F01D 5/005; C22F 1/10; C22C 19/055; F05D 2230/237
See application file for complete search history.

(56) References Cited

U.S. PATENT DOCUMENTS

| | | |
|---|---|---|
| 4,324,594 A | 4/1982 | Chasteen |
| 4,698,130 A | 10/1987 | Restall et al. |

(Continued)

FOREIGN PATENT DOCUMENTS

| | | |
|---|---|---|
| EP | 1 312 437 A1 | 5/2003 |
| EP | 1 844 888 A1 | 10/2007 |
| JP | 2009-228480 A | 10/2009 |

OTHER PUBLICATIONS

Extended European Search Report and Opinion issued in connection with corresponding EP Application No. 17160736.9 dated Aug. 18, 2017.

(Continued)

*Primary Examiner* — Anthony J Zimmer
(74) *Attorney, Agent, or Firm* — James W. Pemrick

(57) ABSTRACT

A method of repairing an oxidized defect in a superalloy article includes removing substantially all of the oxidized defect to form a cleaned out portion of the superalloy article; filling a portion of the cleaned out portion with a weld by fusion welding; cracking the weld; and filling the cracked weld and a remaining portion of the cleaned out portion with a braze material.

19 Claims, 3 Drawing Sheets

(51) Int. Cl.
    *B23K 9/04* (2006.01)
    *B23K 9/23* (2006.01)
    *B23P 6/00* (2006.01)
    *B23P 6/04* (2006.01)
    *C22F 1/10* (2006.01)
    *F01D 5/00* (2006.01)
    *B23K 28/02* (2014.01)
    *B23K 9/235* (2006.01)
    *C22C 19/05* (2006.01)
    *B23K 101/00* (2006.01)
    *B23K 103/08* (2006.01)

(52) U.S. Cl.
    CPC .. *F05D 2230/235* (2013.01); *F05D 2230/237* (2013.01); *F05D 2230/40* (2013.01)

(56) References Cited

U.S. PATENT DOCUMENTS

| | | | |
|---|---|---|---|
| 4,842,183 A * | 6/1989 | Antony | B23K 1/19 228/119 |
| 5,071,054 A | 12/1991 | Dzugan et al. | |
| 5,374,319 A * | 12/1994 | Stueber | B23K 9/23 148/404 |
| 5,685,917 A | 11/1997 | Sangeeta | |
| 5,785,775 A | 7/1998 | Smashey et al. | |
| 5,806,751 A * | 9/1998 | Schaefer | B23K 1/0018 228/119 |
| 5,873,703 A * | 2/1999 | Kelly | B23K 1/0018 228/119 |
| 5,897,801 A * | 4/1999 | Smashey | B23K 9/0026 148/524 |
| 6,004,683 A | 12/1999 | Rafferty et al. | |
| 6,367,686 B1 | 4/2002 | Abriles et al. | |
| 6,972,390 B2 | 12/2005 | Hu et al. | |
| 7,360,678 B2 | 4/2008 | Pietruska et al. | |
| 7,484,651 B2 | 2/2009 | Gandy et al. | |
| 7,780,059 B2 | 8/2010 | Clark | |
| 2006/0200963 A1 | 9/2006 | Lutz | |
| 2006/0231535 A1 | 10/2006 | Fuesting | |
| 2007/0163115 A1 | 7/2007 | Cheng et al. | |
| 2007/0241169 A1* | 10/2007 | Arnett | B23K 1/0018 228/165 |
| 2009/0116533 A1 | 5/2009 | O'Connell et al. | |
| 2010/0236067 A1 | 9/2010 | Hu et al. | |
| 2011/0168679 A1* | 7/2011 | Qi | B23K 26/36 219/75 |
| 2013/0277416 A1 | 10/2013 | Cretegny et al. | |
| 2014/0044939 A1 | 2/2014 | Hunt et al. | |

OTHER PUBLICATIONS

Whims, L. J, Method of Treating Superalloy Articles, GE Co-pending U.S. Appl. No. 15/615,001, filed on Jun. 6, 2017.

* cited by examiner

WELD FORCED CRACK AND BRAZE REPAIR FOR SUPERALLOYS

BACKGROUND

The present disclosure relates generally to repairing high temperature performance alloys, e.g. superalloys.

Metal and alloy parts may experience various wear instances as a result of application fatigue. For example, cracking, abrasions, erosion or a variety of other acts may cause the removal or wear of original substrate material. To repair the worn parts, filler material may be added (e.g., welded or brazed) to fill in cracks, patch abrasions or otherwise replace material lost to erosion or has become defective during operation. To provide strong uniform mechanical properties across the repaired parts, filler material that is the same as, or substantially similar to, the substrate material can be used.

However, high temperature performance alloys (such as nickel and cobalt based super alloys used in hot gas path components of gas turbine parts) have high melting temperatures that require a significant application of energy before they can be applied to the original substrate material. As a result, the large amount of heat produced by a welding apparatus used to melt such filler materials can also affect the nearby substrate material. For example, heat can cause slumping, melting or other changes to the microstructure of the original substrate material. These changes in the substrate material can reduce the original component's strength, toughness and/or other physical characteristics. While other filler materials with lower melting temperatures may alternatively be used, they may provide lower performance at high temperatures and/or possess mechanical properties that are increasingly different than the mechanical properties of the original substrate material. Additionally, the filler material may crack and lower the effectiveness of the repair.

SUMMARY

According to one example, a method of repairing an oxidized defect in a superalloy article comprises removing substantially all of the oxidized defect to form a cleaned out portion of the superalloy article; filling a portion of the cleaned out portion with a weld by fusion welding; cracking the weld; and filling the cracked weld and a remaining portion of the cleaned out portion with a braze material.

According to another example, a method repairing an oxidized defect in a Ni-based superalloy article including Al and Ti comprises removing substantially all of the oxidized defect to form a cleaned out portion of the superalloy article, wherein removing substantially all of the oxidized defect includes vacuum furnace cleaning, mechanical cleaning, and/or chemical cleaning; filling a portion of the cleaned out portion with a weld by fusion welding; cracking the weld by inputting heat while forming the weld or dropping a temperature of the weld, or restraining the weld; filling the cracked weld and a remaining portion of the cleaned out portion with a braze material; covering the weld with the braze material; and heat treating the braze filled and covered weld.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of the disclosure. These features are believed to be applicable in a wide variety of methods comprising one or more examples of the disclosure. As such, the drawings are not meant to include all conventional features known by those of ordinary skill in the art to be required for the practice of the embodiments disclosed herein.

DETAILED DESCRIPTION

Figure 1:
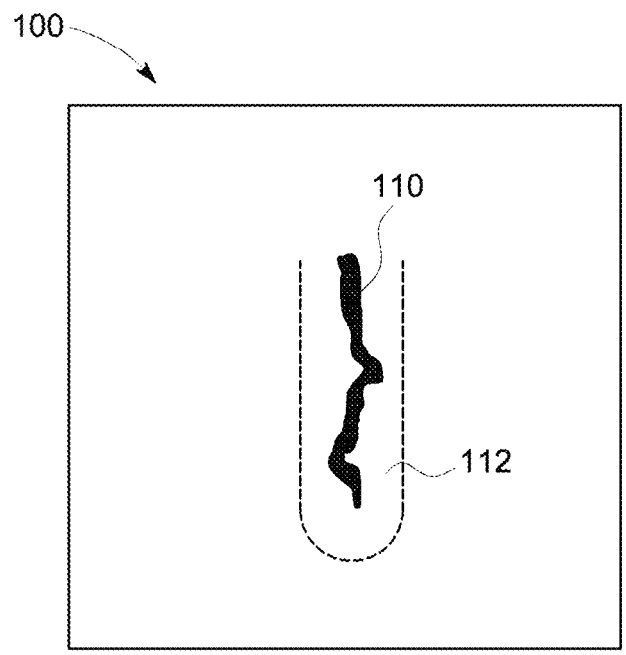
FIG. 1 is a schematic illustration of a superalloy article including a defect.

Referring to FIG. 1, an article 100 formed of a superalloy may have a defect 110, for example a crack or other defective or undesirable material to be removed. The article 100 may be a gas turbine component. The superalloy may be a nickel or iron or cobalt based superalloy. The defect 110 may be oxidized by operation of the article or component in the gas turbine. A portion of the article 100 surrounding the oxidized defect 110, shown in dashed lines, is identified for cleaning in preparation for repairing the article 100.

Figure 2:
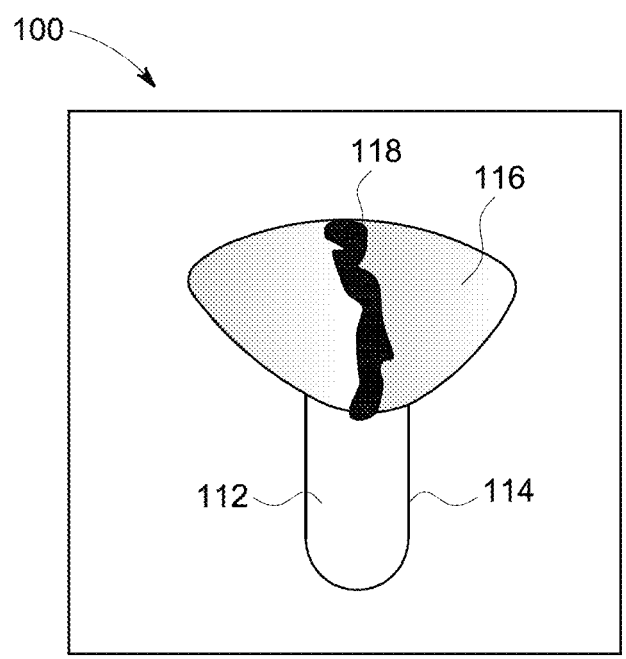
FIG. 2 is a schematic illustration of the article of FIG. 1 at an intermediate stage of repair according to the present disclosure.
Figure 3:
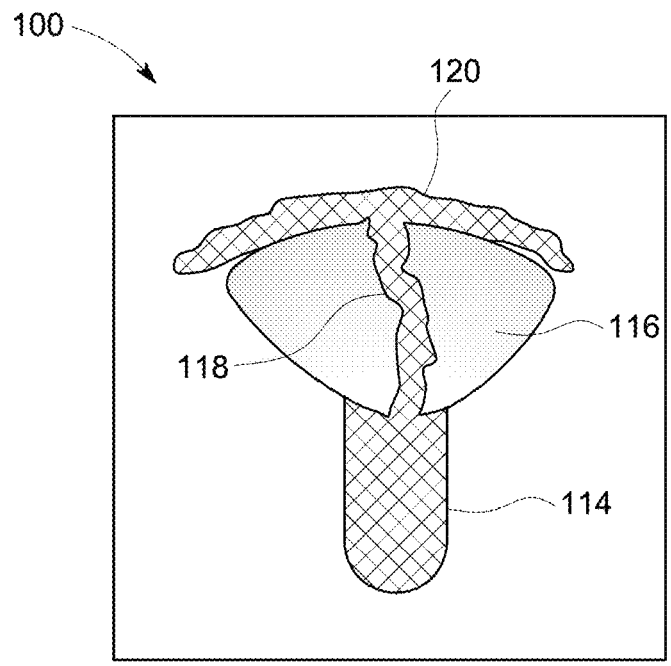
FIG. 3 is a schematic illustration of the article of FIG. 1 in the final repair stage.

Referring to FIG. 2, the defect and the portion surrounding the defect are removed by a cleaning process to provide a cleaned out portion 112 of the article 100. A weld 116 is provided in the cleaned out portion 112 and outside the cleaned out portion 112. A portion 114 of the cleaned out portion 112 is not filled with the weld. A crack 118 is then formed in the weld 116. Referring to FIG. 3, a braze material 120 is provided over the weld 116, through the crack 118 in the weld 116, and into the unfilled portion 114 of the cleaned out portion 112 of the article 100.

Figure 4:
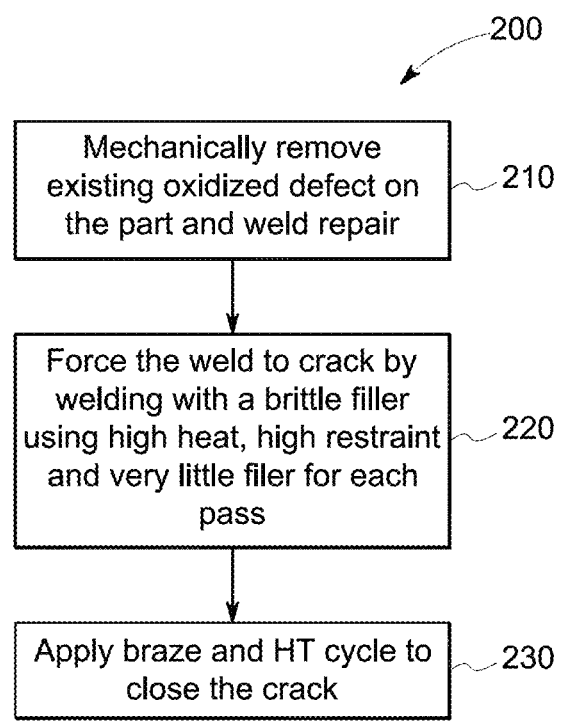
FIG. 4 is a schematic illustration of a repair method according to the present disclosure.

Referring to FIG. 4, a method 200 of repairing a defect in an article formed of a superalloy includes removing the oxidized defect from the article (i.e. removing the portion of the article including the defect and the oxidized portion of the article surrounding the defect) and repairing the article by welding a filler material into the removed portion 210. The weld is then cracked 220 and a braze is applied to close the weld crack and a heat treatment cycle is performed 220.

Referring again to FIGS. 1-3, the oxidized defect 110 may be cleaned by a mechanical process, a chemical process, or a combination of a mechanical and chemical process. The oxidized defect 110 may also be cleaned by vacuum furnace cleaning. For articles 100 that are formed of superalloys containing Ti and Al, fluoride ion cleaning may be used. Hydrogen cleaning may also be used, for example for iron, nickel, and cobalt based superalloys. Mechanical cleaning may include grinding the article 100 to remove the oxidized defect. Chemical cleaning may include etching.

The weld 116 may be formed of a material that is the same as the material of the article 100, or of a material that is similar to the material of the article 100. The weld 116 may be cracked during or after formation. The weld may be formed by fusion welding. As used herein, the term "fusion welding" refers to welding processes that rely upon melting to join materials of similar compositions and melting points, but does not include diffusion bonding processes. Fusion welding processes that may be used include arc welding, oxy-fuel welding, electric resistance welding, laser beam welding, electron beam welding, thermite welding, and plasma welding, as well as constant current, constant voltage, and high energy beam welding processes. Metal Inert Gas (MIG) welding, for example Cold Metal Transfer™ or Cold Metal Transfer Printing™ technology of Fronius International of Portage, Ind., or Gas Tungsten Arc Welding (GTAW), such as Tungsten Inert Gas (TIG) welding technology of TIP TIG USA of Runnemede, N.J., may be used. As shown in FIG. 2, the cleaned out portion 112 of the article 100 is welded but includes an unfilled portion 114 that allows for filling of the weld crack 118 by the braze material 120 by, for example, capillary action. The unfilled portion 114 also facilitates cracking the weld 116. The braze material 120 may be any diffusion braze alloy. The braze material 120 may be a combination of a high melt material and a low melt material.

The weld crack 118 may be formed by heat input during welding (e.g. through induction), or through extreme temperature drop (e.g. quenching), or by restraining the weld. The weld crack 118 may be formed in any welding environment, for example an argon (Ar) rich environment. The weld crack 118 need not be formed in a chromium-halide environment as used in the prior art. The weld crack 118 that is created is essentially free from oxidation corrosion caused by engine operation, as the process(es) used to form the cleaned out portion 112 remove substantially all of the oxidation of the defect 110 in the article 100. The surfaces of the weld crack 118 are thus low in surface tension and promote infiltration of the braze material 120 by capillary action when the braze material 120 liquifies.

The brazed weld may be heat treated to promote filling of the braze material 120 into the weld crack 118, and to remove residual stress from the weld 116. The heat treatment may include heating the article 110 and the brazed weld for one or more cycles at dwell temperatures and times sufficient to fill the weld crack 118 with the braze material 120 and remove residual stress from the weld 116.

Figure 5:
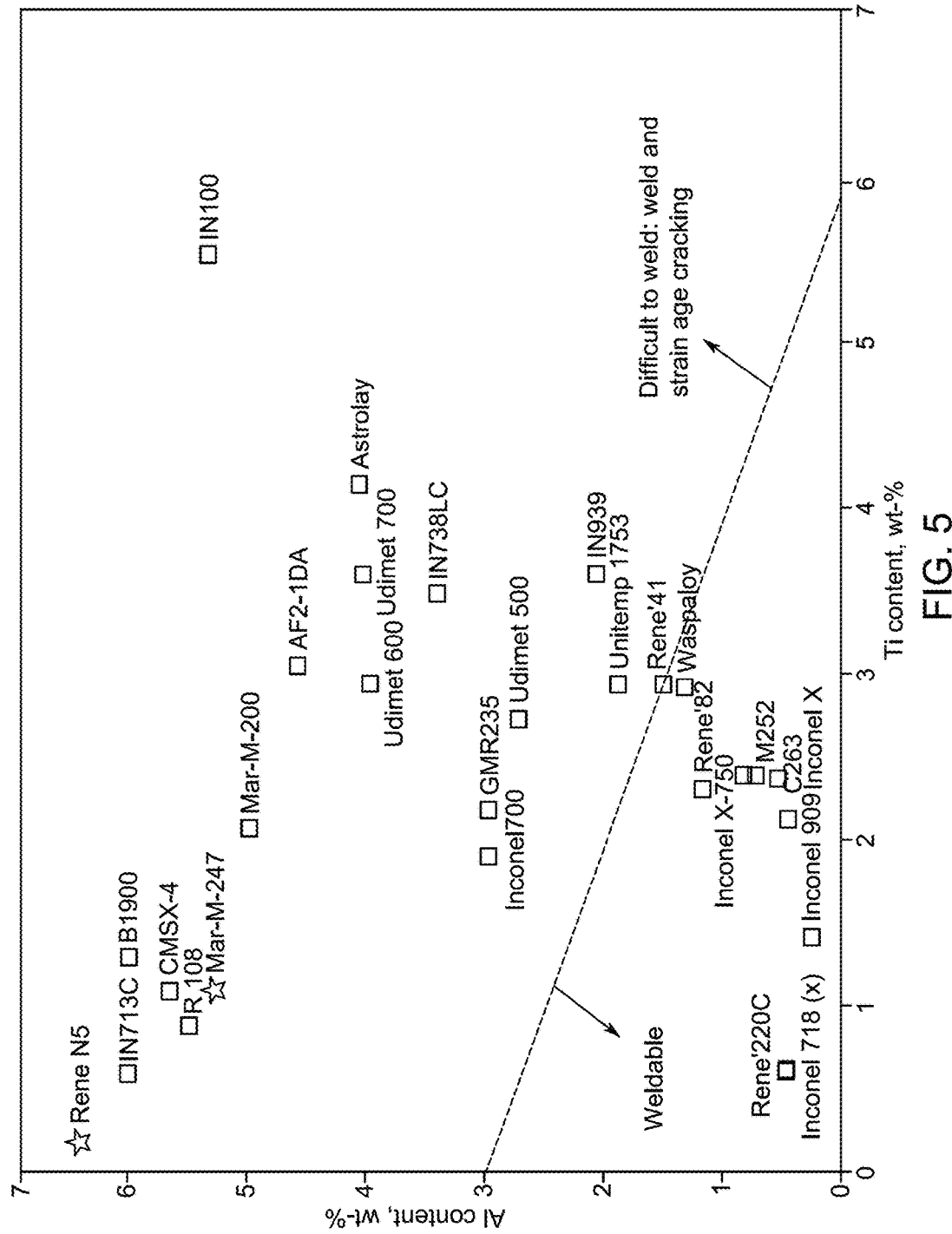
FIG. 5 is a chart showing various superalloys that may be repaired according to the present disclosure.

Referring to FIG. 5, Ni-based superalloys, including gamma prime (γ') superalloys, may include varying amounts of Ti and Al as shown. The dashed line represents a general boundary between Ni-based superalloys that are generally more weldable (below the dashed line) and Ni-based superalloys that are more difficult to weld due to strain age cracking that may develop in the weld and/or article. The methods disclosed herein may be used for any of the Ni-based superalloys shown in FIG. 5, and other superalloys based on Fe or Co, but may be particularly well suited to the more difficult to weld Ni-based superalloys shown in FIG. 5, i.e. those having an Al content above about 3% and a Ti content above about 6%.

The methods for repairing defects in articles formed of superalloys disclosed herein reduce, or eliminate, the use of expensive cleaning processes, such as fluoride ion cleaning. The methods also improve the structure of the repair structure (e.g. the braze and the weld) and the repaired superalloy article or component. While prior art methods have focused on preventing cracking of the weld repair, the methods disclosed herein take the opposite approach and allow or create cracking of the weld to form an improved repair not possible with prior art methods.

Approximating language, as used herein throughout the specification and claims, may be applied to modify any quantitative representation that could permissibly vary without resulting in a change in the basic function to which it is related. Accordingly, a value modified by a term or terms, such as "about" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Turbine components that may be repaired according to methods of the present disclosure include shrouds, buckets, blades, nozzles, vanes, seal components, valve stems, nozzle boxes, and nozzle plates.

This written description uses examples to disclose the embodiments of the present disclosure, including the best mode, and also to enable any person skilled in the art to practice embodiments of the present disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of repairing an oxidized defect in a superalloy article, the method comprising:
   removing substantially all of the oxidized defect to form a cleaned out portion of the superalloy article;
   filling a portion of the cleaned out portion with a weld by fusion welding;
   cracking the weld; and
   filling the cracked weld and a remaining portion of the cleaned out portion with a braze material; wherein cracking the weld comprises dropping a temperature of the weld at a rate sufficient to cause cracking during the welding; and wherein cracking the weld comprises quenching the weld.

2. The method of claim 1, wherein removing substantially all of the oxidized defect to form the cleaned out portion includes vacuum furnace cleaning.

3. The method of claim 2, wherein the vacuum furnace cleaning includes fluoride ion cleaning.

4. The method of claim 1, wherein removing substantially all of the oxidized defect to form the cleaned out portion includes mechanical cleaning.

5. The method of claim 4, wherein the mechanical cleaning comprises grinding.

6. The method of claim 1, wherein removing substantially all of the oxidized defect to form the cleaned out portion includes chemical cleaning.

7. The method of claim 6, wherein the chemical cleaning includes etching.

8. The method of claim 1, wherein filling the portion of the cleaned out portion with the weld comprises filling the portion with weld material that is the same as the superalloy article.

9. The method of claim 1, wherein cracking the weld comprises cracking the weld after the weld is formed.

10. The method of claim 1, wherein cracking the weld comprises inputting heat while forming the weld.

11. A method of repairing an oxidized defect in a superalloy article, the method comprising:

removing substantially all of the oxidized defect to form a cleaned out portion of the superalloy article;
filling a portion of the cleaned out portion with a weld by fusion welding;
cracking the weld; and
filling the cracked weld and a remaining portion of the cleaned out portion with a braze material, wherein cracking the weld comprises inputting heat while forming the weld by induction heating.

12. The method of claim 1, further comprising:
covering the weld with the braze material.

13. The method of claim 1, further comprising:
heat treating the braze filled weld.

14. The method of claim 1, wherein fusion welding comprises Metal Inert Gas (MIG) welding or Gas Tungsten Arc Welding (GTAW).

15. The method of claim 14, wherein fusion welding comprises Tungsten Inert Gas (TIG) welding.

16. The method of claim 1, wherein the braze material comprises a combination of high melt material and low melt material.

17. A method repairing an oxidized defect in a Ni-based superalloy article including Al and Ti, the method comprising:
removing substantially all of the oxidized defect to form a cleaned out portion of the superalloy article, wherein removing substantially all of the oxidized defect includes vacuum cleaning, mechanical cleaning, and/or chemical cleaning;
filling a portion of the cleaned out portion with a weld by fusion welding;
cracking the weld by restraining the weld;
filling the cracked weld and a remaining portion of the cleaned out portion with a braze material;
covering the weld with the braze material; and
heat treating the braze filled and covered weld.

18. The method of claim 17, wherein the Ni-based superalloy comprises greater than about 3% Al and less than about 6% Ti.

19. The method of claim 17, wherein filling the weld by fusion welding comprises Metal Inert Gas (MIG) welding or Gas Tungsten Arc Welding (GTAW).

* * * * *